United States Patent [19]

Kleinecke et al.

[11] 4,448,450
[45] May 15, 1984

[54] DEFEATABLE HANDLE AND INTERLOCK FOR ELECTRICAL EQUIPMENT ENCLOSURE

[75] Inventors: John D. Kleinecke; Thomas R. Little, both of Wichita Falls, Tex.

[73] Assignee: Siemens-Allis, Inc., Atlanta, Ga.

[21] Appl. No.: 377,436

[22] Filed: May 12, 1982

[51] Int. Cl.³ .......................... E05C 3/04; H01H 33/48
[52] U.S. Cl. .................................. 292/210; 200/50 A; 292/350; 292/DIG. 27; 361/344
[58] Field of Search ................... 200/50 A; 361/344; 292/210, DIG. 27, 350, DIG. 63

[56] References Cited

U.S. PATENT DOCUMENTS

| | | | |
|---|---|---|---|
| 663,791 | 12/1900 | Simmons | 292/210 X |
| 3,637,960 | 1/1972 | Plantholt et al. | 200/50 A |
| 3,848,102 | 11/1974 | Jencks et al. | 200/50 A X |
| 4,034,169 | 7/1977 | Armstrong et al. | 361/344 X |

FOREIGN PATENT DOCUMENTS

| | | | |
|---|---|---|---|
| 17899 | of 1915 | United Kingdom | 361/344 |
| 734845 | 8/1955 | United Kingdom | 200/50 A |

*Primary Examiner*—Gary L. Smith
*Assistant Examiner*—R. Illich
*Attorney, Agent, or Firm*—John L. James

[57] ABSTRACT

A lever-type handle for operating a racking mechanism and providing an interlock for a cabinet enclosing electrical equipment. The handle is comprised of two sections which are linked together by a throughbolt. A cover assembly retaining and enclosing a portion of the handle is provided with an opening oriented so that the bolt is only accessible when the handle is in an "on," or energized, position. By removing the through bolt the handle sections are disengaged so that one portion can be moved to a non-locking position and access gained to the cabinet interior.

11 Claims, 4 Drawing Figures

DEFEATABLE HANDLE AND INTERLOCK FOR ELECTRICAL EQUIPMENT ENCLOSURE

BACKGROUND OF THE INVENTION

The present invention relates to handle and interlock systems, and more particularly to an improved, defeatable handle assembly for cabinets enclosing electrical gear. The handle assembly to be described is usable in conjunction with a racking mechanism such as that shown in application Ser. No. 373,092 "Racking Mechanism for Motor Control Center or the like"—J. Kleinecke and T. Little, filed concurrently herewith.

Medium and high voltage switchgear and electrical control apparatus ae conventionally housed in sheet metal enclosures which not only provide a mounting for the main contactor assemblies and auxiliary apparatus and protect the apparatus from damage, but also serve to prevent unauthorized access to the energized electrical equipment therein. Since the equipment frequently includes high voltage members and exposed conductors, there is obviously danger of damage to equipment and injury to personnel if it is readily accessible. For this reason, cabinets which enclose such gear are frequently divided into high voltage and low-voltage sections. The low-voltage apparatus, including controls, meters and the like is housed in a first cabinet to which access may be gained by simply disengaging a latch and opening a door. The high voltage equipment, conventionally including a contactor and associated gear, is usually housed in a different compartment which is isolated by means of sheet metal partitions. Elaborate precautions are taken to assure that the high voltage compartment cannot be opened unintentionally, or by unauthorized individuals. Frequently either a rotatable or a lever-type handle is provided in conjunction with a racking mechanism, and the contactor assembly placed on a removable carriage. As described in application Ser. No. 373,092 referred to above, the racking mechanism engages the carriage and urges it into electrical contact with fixed bus bars of the like which are placed in the compartment. The racking mechanism is conventionally interlocked with the door assembly so that the mechanism cannot be racked, or brought into contact with energized bus bars, unless the cabinet is closed and secure. In this manner the assembly is only energized when the enclosure is closed.

It is conventional for the handle assembly to be interlocked with the racking mechanism and door assembly in such a manner that when the mechanism is racked, and the handle in its "on" position, the door may not be opened and access cannot be gained to the live equipment within. However, in some circumstances it may be necessary to open the compartment while the apparatus is energized. Owing to the hazard involved such access is restricted to authorized, skilled individuals who have the appropriate training and background to work on the system in its live state. Ordinarily provision for one or more padlocks is made so that only authorized individuals who have keys to the locks can open the compartment.

While in principle there are numerous mechanisms which can be adapted to use for racking, securing and interlocking the contactor and cabinet assembly, owing to the large mechanical forces involved and the size of the various mechanical elements it has been found difficult to provide an interlocking mechanism which operates easily to rack the contactor mechanism, is relatively economical and straight forward to manufacture, and is not unduly intricate. Further the mechanisms required for defeating the interlocking operation have frequently been cumbersome, expensive and complex and in some instances difficult to use. Accordingly, it will be appreciated that it would be highly desirable to provide an improved racking handle mechanism for an electrical enclosure which is straightforward in design, easily manipulated, and bearing a non- -obvious but easily accessible defeat mechanism.

Accordingly, it is an object of the present invention to provide an improved interlock handle and defeat system for an electrical equipment enclosure.

Another object is to provide an easily constructed handle mechanism for an electrical enclosure whose operation may be readily defeated by individuals who understand the operation of the system.

Yet another object is to provide a door interlock system and handle combination which is effective, difficult to overpower, and whose defeat mechanism is not immediately apparent to an operator.

SUMMARY OF THE INVENTION

Briefly stated, in accordance with one aspect of the invention the foregoing objects are achieved by providing an elongated handle member with a handle on one end and a shaft on the other, and means for rotatably supporting the shaft adjacent an electrical cabinet. An elongate arm is provided with a hole on one end which slides over the shaft and a passage is drilled transverse to the hole, which aligns with a similar passage drilled transversely in the shaft. A threaded fastener is passed through the aligned openings, locking the elongate arm to the shaft so that the arm moves in concert with the handle. A cover assembly placed over the shaft end of the handle and secured to the cabinet is provided with an opening which aligns with the threaded fastener when the handle is in an "on" position so that the fastener may be removed to disengage the arm from the shaft. The end of the shaft is provided with an abutment which interferes with a tongue on the door when the handle is in the "on" position but after the fastener is removed the handle may be rotated to the "off" position so that the door may be opened without changing the status of the mechanism within the cabinet.

In a preferred embodiment a pivoted latch engages the elongate arm when the handle is in the "off" position. A mating bar on the door raises the latch when the door is closed, allowing the handle to be moved to its "on" position.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
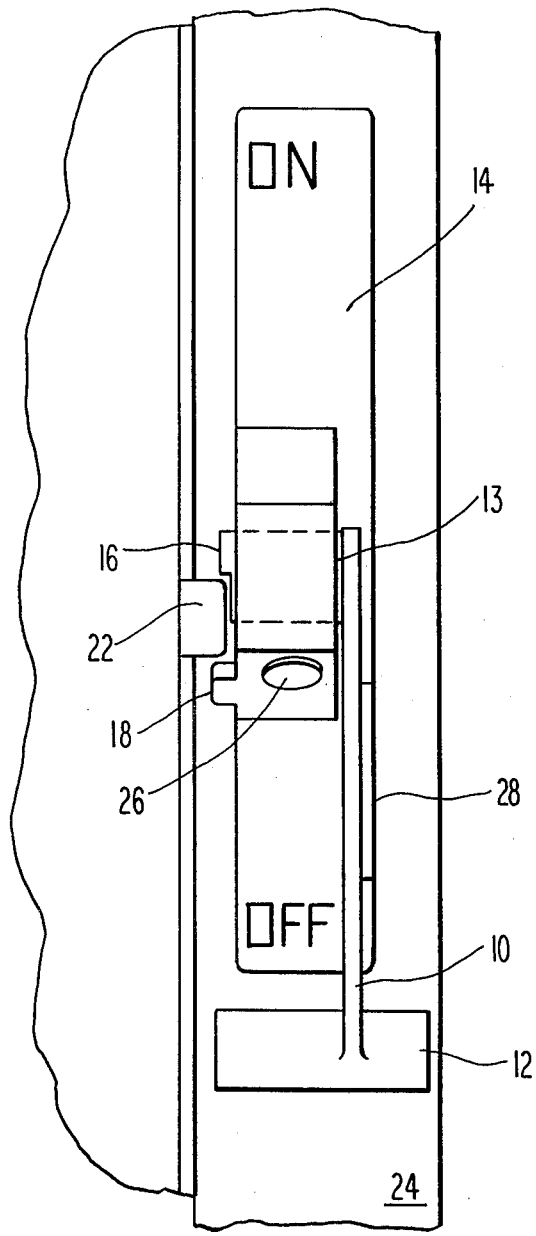
FIG. 1 is an external view of the handle assembly in its "off" position.

FIG. 1 illustrates the outer portion of the handle assembly in the "off" position. The assembly includes an elongate handle member 10 having an end portion 12 adapted to be manually grasped. A shaft 13 extends transversely to the handle member near the inner end thereof, the shaft being obscured by a cover 14 which encloses portions of the handle mechanism and bears "off" and "on" legends indicating the unracked and racked positions, respectively, of the apparatus within the enclosure. The left end of the shaft is provided with an abutment 16 below which is a ramp-like member 18 extending from one side of cover 14. A cabinet door 20 has a tongue 22 protruding therefrom. When the door is closed tongue 22 seats against the surface of cabinet jamb 24, between the shaft abutment 16 and the ramp 18. The cover is also provided with an opening at a lower, inclined surface thereof, and a closure such as a button, or plug 26 is snapped into the opening. A hasp 28 may be molded into cover 14, upstanding adjacent handle 10 and having a slot which mates with a corresponding slot or hole in the handle so that the handle may be padlocked to the hasp, and the assembly locked in the "off" position.

Figure 2:
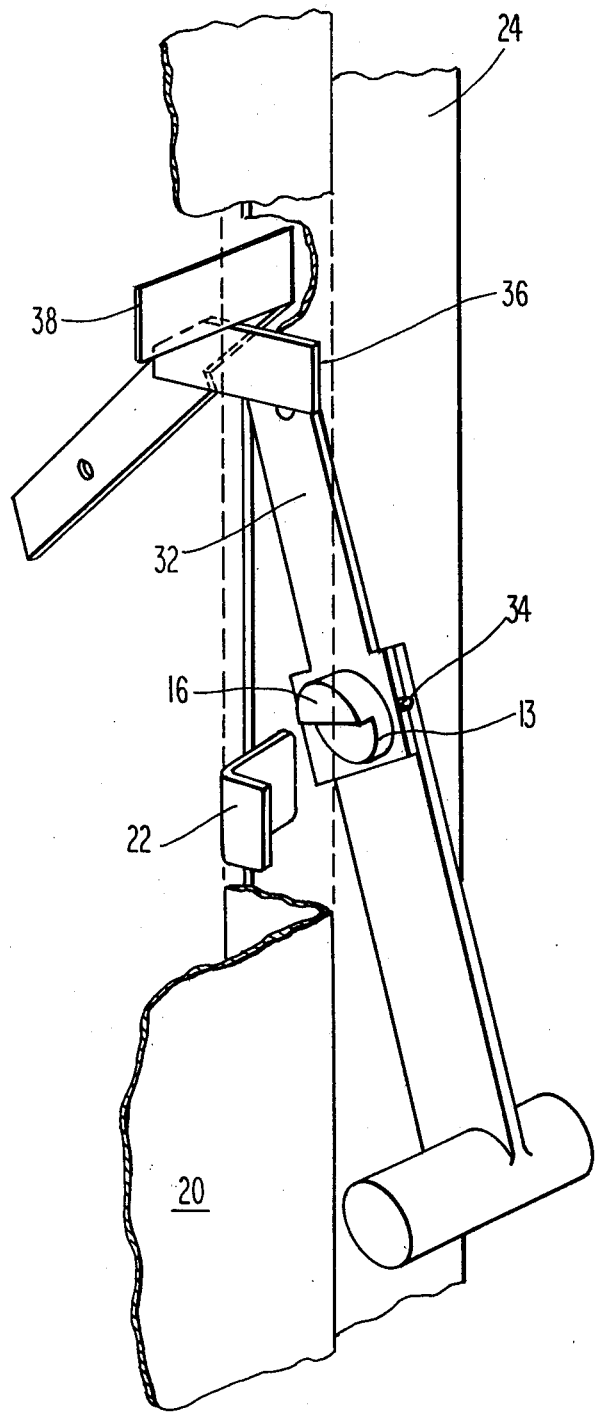
FIG. 2 is an oblique view of the handle assembly with some elements removed to illustrate the interaction of various of members.

Referring now to FIG. 2 the handle assembly, absent support and covering means, is shown still disposed in the "off" position. Shaft 13, which is affixed to the inner end of handle member 10, is seen extending through an opening in the lower end of an elongate arm 32. The arm is a slip fit upon shaft 13, and in order that arm 32 move with handle 10 a pin such as threaded fastener 34 extends through a hole drilled transversely through the lower end of arm 32, and a matching hole drilled through shaft 13. Another hole is provided in the opposite end of arm 32 for engaging a racking mechanism linkage (not shown).

In FIG. 2 door 20 is cut away to reveal tongue 22, which may be resistance welded or similarly fastened to the free edge of the door. Tongue 22 extends outwardly to meet jamb 24, passing under the abutment of shaft 13 when the handle is in its "off" position, as shown. When the handle is raised to its "on" position shaft 13 rotates so that abutment 16 blocks tongue 22 and keeps door 20 from being opened.

A bar 36 is also fastened to the door and penetrates into the enclosure. The upper edge of the bar is preferably beveled as shown, so that it engages the lower edge of an interlock latch 38. The interlock latch is provided with a notch at its lower edge so that when the arm is not supported by bar 36 it moves downwardly and engages the upper end of arm 32. In this manner when door 20 is opened and bar 36 is not present, latch 38 moves downwardly and catches the upper arm 32 of the handle mechanism to prevent it from moving inwardly. This has the effect of locking the handle in its "off" position so that the racking mechanism cannot be operated with the door open unless one purposely manually raises latch 38 and intentionally defeats the system. This feature forms a valuable safeguard inasmuch as the handle cannot be thoughtlessly raised to the "on" position and the electrical apparatus energized absent the deliberate action of the operator in manually defeating the system by raising latch 38. At the same time, it may be desirable to operate the racking mechanism, for instance to check its operation or the engagement of the contactor with the various fixed contacts in the enclosure, when it is assured that power has been disconnected. In such an instance it is highly desirable that the mechanism be able to be manually defeated without undue difficulty.

Figure 3:
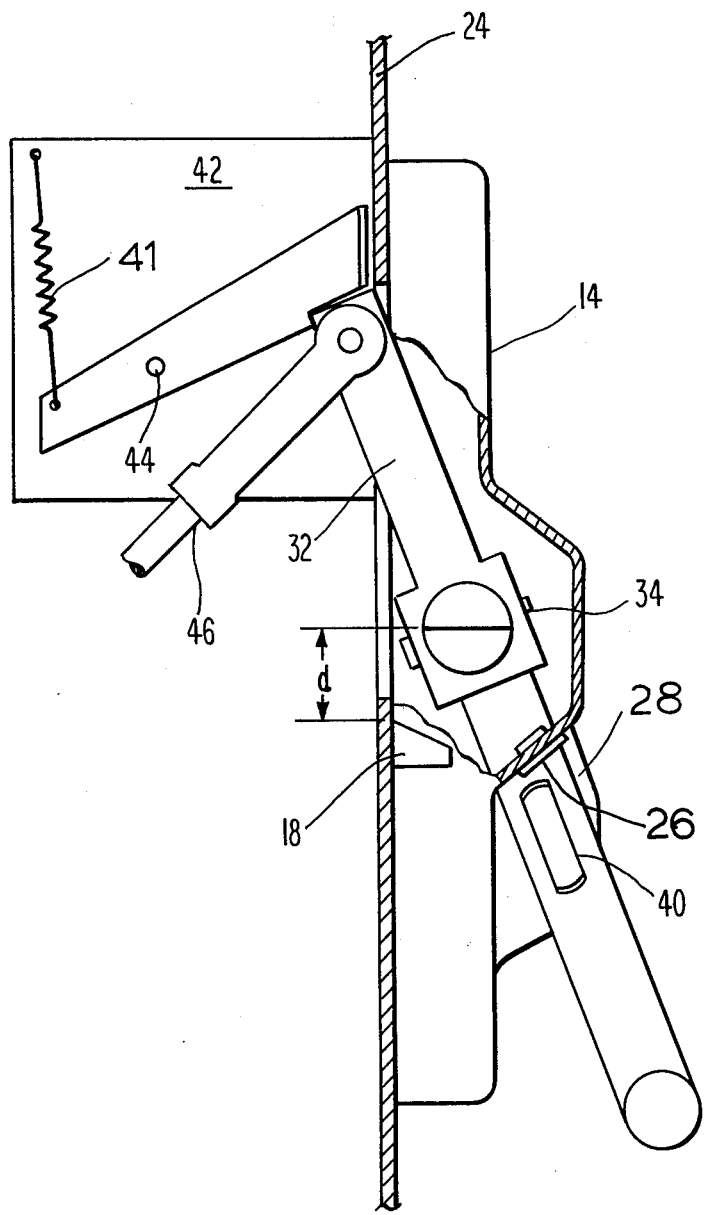
FIG. 3 is a partly sectioned side elevation view of the handle assembly.

FIG. 3 illustrates the relationship of the various elements of the system, including housing 14 which is attached to the surface of door jamb member 24. If sufficiently rigid, the housing may serve to support shaft 13 within it, the shaft extending through a hole in either side of the housing. Alternatively, the shaft may be supported by another member, such as a metal bracket extending from the door jamb. In the "off" position illustrated in FIG. 3, with handle end 12 at its lowermost position, a slot 40 in the handle aligns with a similar slot in hasp 28 so that a padlock or the like can be inserted through the opening and the handle locked in the "off" position. In this position arm 32 is raised to its upward most position, aligning with a notch on the bottom edge of latch 38. The latter is biased in a clockwise direction by means of a coil spring 41 which is anchored to a hole in support plate 42, to which latch 38 is pivotally secured by means of a pin or bolt 44. With the door open, bar 36 is withdrawn so that latch 38 is free to move downwardly, engaging the uppermost end of arm 32 and preventing the handle from being moved from the "on" position. A clevis 46 is shown coupled to the upper end of arm 32, it being understood that the other end of the clevis is connected to a racking mechanism (not shown) so that when the handle is in the illustrated position the racking mechanism has disconnected the electrical equipment within the housing from live elements. Accordingly, in the position shown and with the door open the apparatus within is unracked, and can be safely worked on.

Also visible in FIG. 3 is a ramp 18 which is disposed just beneath the path of tongue 22. In the event that the enclosure door sags or is distorted, ramp 18 will force the tongue to ride upwardly to a position wherein abutment 16 will interfere with it when the handle is rotated to its "on" position. A gap with a height d is therefore presented between abutment 16 and ramp 18, for receiving tongue 22 while the handle is in the "off" position. It will also be noted that bolt 34, which secures arm 32 to shaft 13, is oriented so that access cannot be had to it from outside the enclosure. The head of the bolt, at the left hand side of arm 32 in FIG. 3, cannot be reached from without the enclosure.

In order to rack the equipment into place, thereby allowing it to be energized if voltage is present on the line-connected bus bars, handle 12 must be moved to the "on" position. However with the door open, as shown in FIG. 3, the handle cannot be moved except by purposely manually raising latch 38 so that the handle can be rotated. Additional protection can be provided by inserting a padlock in slot 40, thereby assuring that the equipment cannot be racked in place. With the door shut, bar 36 encounters the lower edge of latch 38 and pushes the latter upward, freeing the upper end of arm 32 so that the handle assembly can then be pushed up to its "on" position. Closing door 20 brings tongue 22 against the jamb member 24, after which movement of the handle member causes abutment 16 to rotate approximately 90 degrees to block the path of latch 22 so that the door cannot be opened while the handle is in its uppe or "on" position.

It has been recognized by the present inventor that in certain situations it may be necessary to gain access to the enclosure while the apparatus is energized, or in any event while it is still racked into an energized position, corresponding to a location of the handle in its "on" position. However, the latching arrangement constituted by tongue 22 and abutment 16 seemingly prevents this. For this reason the inventor has releasably secured arm 32 to shaft 13 by means of bolt 34, and oriented the latter in such a manner that it can only be removed when the handle is in the "on" position.

Figure 4:
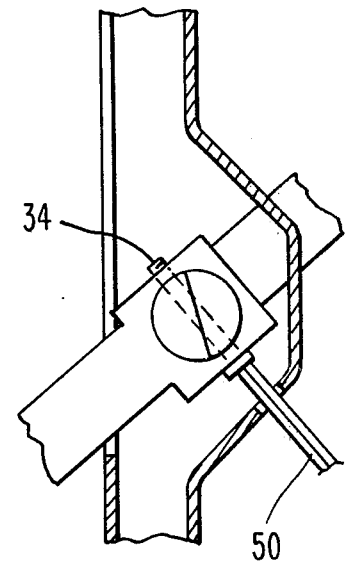
FIG. 4 is a side elevation view of the elements of FIG. 3 with the handle in an "on" position.

Referring now to FIG. 4, the handle is depicted in its upper or "on" position, having rotated arm 32 downwardly to a position wherein the electrical mechanism in the enclosure is fully racked in place. Plug 26 is pried free from the opening in the lower surface of housing 14 and tool 50, such as in allen wrench, screwdriver or the like is inserted through the hole to engage the head of bolt 34. The bolt is then unscrewed and removed through the hole in housing 14, whereupon shaft 13 is free to be turned by handle 12. In this manner abutment 16 may be rotated approximately 90 degrees to open a path for tongue 22 so that the door may be opened. The defeated system can be easily reconstituted by raising the handle member to its upper position, as shown in FIG. 4, and reinserting bolt 34 so that arm 32 is once again secured to shaft 13.

A significant safety feature occurs as a result of the method required to defeat the interlock in that the system may not be returned to normal operation minus the interlock feature. Reinserting bolt 34 not only restores the normal racking function, but insures that the door interlock function is simultaneously restored. It should be noted there are other commonly used systems which have a similar interlock defeat feature; however, the defeat method involves removal of one or more interlock parts. It is possible after defeating the interlock to operate the system in a seemingly normal manner even though the interlock parts which were removed were not reinstalled.

It will now be appreciated that the present invention constitutes a rugged, straightforward mechanism which provides the desired interlock functions yet is readily defeated by individuals having knowledge of the system's construction. Further, the assembly may be constructed of parts which are relatively easily fabricated of stock steel elements or as in the case of cover member 14, molded from a strong plastic material. It will therefore be evident from the following description that certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters patent of the United States is:

1. A handle interlock for an electrical equipment enclosure having a pivoted door with a tongue extending therefrom and a jamb adjacent said door, comprising:
    an elongate handle member having a manually graspable protion on one end and a shaft extending generally transversely thereto at the other end;
    support means, secured to the jamb of the enclosure, for rotatably supporting said shaft;
    an elongate arm having an opening adjacent a first end rotatably receiving said shaft therethrough, and having a second end adapted to be coupled to a mechanism within said enclosure;
    a fastener releasably securing said first end of said elongate arm to said shaft for causing said arm to rotate with said shaft; and
    an abutment extending from one end of said shaft, said abutment interfering with the tongue on the door when said shaft is in an on position to prevent opening of the door, said abutment being clear of said tongue when said handle is in an off position to allow opening of said door,
    whereby release of said fastener allows said handle to be moved from an on position to an off position with respect to the door tongue without causing a corresponding movement of said elongate arm.

2. The invention defined in claim 1, wherein said fastener comprises a threaded bolt which extends through at least a part of said first end of said elongate arm and transversely penetrates said shaft.

3. The invention defined in claim 2, wherein said support means substantially surrounds said shaft, said support means defining an opening which aligns with said fastener when said abutment is in an interfering relationship with the tongue to allow access to and removal of the fastener.

4. A handle interlock for an enclosure of the type enclosing electrical equipment therein and having a racking mechanism for effecting movement for at least part of the electrical equipment in concert with movement of a handle mechanism, said enclosure including a pivoted door having a tongue extending therefrom and a jamb adjacent the door, comprising:
    an elongate handle member having a manually graspable end at a first end thereof and a cylindrical shaft extending transversely from the other end;
    support means attached to said jamb and rotatably supporting said shaft;
    an elongate arm having an opening adjacent a first end for slidably receiving the shaft, and a second end extending through said jamb and adapted to be coupled to a mechanism within the enclosure;
    a fastener removably extending through said one end of said elongate arm and said shaft for causing said arm to rotate in concert with said shaft when extended and causing said shaft to rotate free of said arm when released; and
    an abutment extending from said shaft, said abutment interfering with said tongue when said handle is in a first position to prevent opening of said door, and being clear of said tongue when said handle is in a second position to allow the door to be opened said handle being movable between the first and second positions when the fastener is released without moving said elongate arm.

5. The invention defined in claim 4, further including a latch member pivotally disposed within said enclosure;
    biasing means for biasing said latch member into a first position for engaging said second end of said elongate arm when said handle is in a second position; and
    a bar coupled to said door for engaging said latch and forcing said latch out of the path of said second end of said elongate arm, whereby said handle means may be moved from a second to a first position.

6. The invention defined in claim 5, further including a housing attached to said jamb and enclosing at least said shaft, said housing having an opening therein, one end of said fastener aligning with said opening when said handle is in said first position to thereby allow the removal of said fastener through said opening.

7. A handle interlock for an electrical equipment enclosure having a pivotal door with a tongue extending therefrom, comprising:
- a shaft having a longitudinal axis and an abutment extending from one end of said shaft, said shaft being rotatable from a first position at which said abutment interferes with said door tongue and prevents the door from opening to a second position at which said abutment is free of interference with the tongue;
- support means for rotatably supporting the shaft, said support means being secured to the enclosure, said shaft being rotatable about its longitudinal axis;
- an elongate handle member having a manually graspable portion on one end and an opening adjacent to the other end, said shaft extending through said opening, said elongate handle member being pivotally movable with the shaft about the axis of the shaft from a first position at which the shaft is in its first position to a second position at which the shaft is in its second position;
- an elongate arm having a first end portion with an opening therein and being of a construction sufficient for rotatably receiving the shaft therethrough and having a second end of a construction sufficient for coupling to a mechanism within said enclosure; and
- a fastener releasably securing said first end of said elongate arm to said shaft, said arm being free to rotate with said shaft while said fastener is secured, said elongate handle member being free to move from the first position to the second position free of movement of said elongate arm upon release of said fastener, whereby said enclosure door can be opened.

8. The invention defined in claim 7, wherein said fastener comprises a threaded bolt which extends through at least a part of said first end of said elongate arm and transversely penetrates said shaft.

9. The invention defined in claim 8, wherein said support means substantially surrounds said shaft, said support means defining an opening which aligns with said fastener when said abutment is in an interfering relationship with the tongue to allow access to and removal of the fastener.

10. The invention defined in claim 7, further including a latch member pivotally disposed within said enclosure;
- biasing means for biasing said latch member into a first position for engaging said second one end of said elongate arm when said handle is in a second position; and
- a bar coupled to said door for engaging said latch and forcing said latch out of the path of said second end of said elongate arm, whereby said handle means may be moved from a second to a first position.

11. The invention defined in claim 10, further including a housing attached to said enclosure and enclosing at least said shaft, said housing having an opening therein, one end of said fastener aligning with said opening when said handle is in said first position to thereby allow the removal of said fastener through said opening.

* * * * *